United States Patent [19]

Chambers

[11] Patent Number: 4,877,905

[45] Date of Patent: Oct. 31, 1989

[54] POLYETHER COMPOUNDS AND THEIR PREPARATION

[76] Inventor: Richard D. Chambers, 5 Aykley Green, Whitesmocks, Durham City, England, DH1 4LM

[21] Appl. No.: 55,023

[22] Filed: May 28, 1987

[30] Foreign Application Priority Data

May 28, 1986 [GB] United Kingdom ............... 8612983

[51] Int. Cl.$^4$ .................... C07L 43/11; C07L 43/12
[52] U.S. Cl. ................................ 568/615; 568/103; 568/104; 568/606
[58] Field of Search ...................... 568/615, 603, 604

[56] References Cited

PUBLICATIONS

Translation of Japan 101307, supplied previously.

*Primary Examiner*—Howard T. Mars
*Attorney, Agent, or Firm*—Cushman, Darby & Cushman

[57] ABSTRACT

Novel polyether intermediates having the general formula

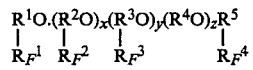

may be prepared by reaction of a fluoroalkene with a polyether of formula

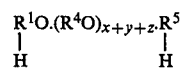

or

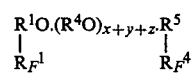

and may be fluorinated with elemental fluorine to yield novel perfluoropolyethers having the general formula

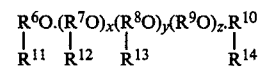

In the above general formulae, the symbols $R^1$ to $R^5$ each represent the same or different substituted or unsubstituted hydrocarbon groups, the symbols $R_F^1$ to $R_F^4$ each represent the same or different fluorine-containing hydrocarbon groups with at least two carbon atoms and at least two fluorine atoms, or the combination $R^1$-$R_F^1$ and/or the combination $R^5$-$R_F^4$ represents a fluoroalkyl or fluoroalkenyl group, the symbols $R^6$ to $R^{14}$ each represents a fully fluorinated hydrocarbon group, x is an integer, each of y and z is zero or an integer, and the sum of x, y and z is from 2 to 100.

5 Claims, No Drawings

POLYETHER COMPOUNDS AND THEIR PREPARATION

This invention was made with U.S. Government support under AFOSR Grant 82-0084 awarded by the United States Air Force. The U.S. Government has certain rights in this invention.

The invention comprises certain novel polyether compounds and processes for their preparation. In particular, it relates to such compounds wherein some or all of the hydrogen atoms in the molecule are replaced by fluorine atoms.

Various perfluoropolyethers (that is, fully fluorinated polymeric ether compounds) have been developed in recent years and are available as commercial products. These products display a variety of useful properties, including high resistance to thermal and chemical attack, very low solubility in most usual solvents and very good lubricating properties.

The available perfluoropolyethers are based on polyether chains, examples of which may be represented by the following general formulae:

$$-(CF_2CF_2CF_2O-)_n,$$

$$-(OCF-CF_2-)_n,$$
$$\phantom{-(O}|$$
$$\phantom{-(OCF-}CF_3$$

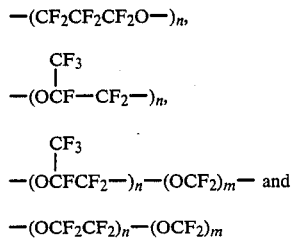

$$-(OCF_2CF_2)_n-(OCF_2)_m$$

Each of these types of perfluoropolyether is prepared by a different multi-stage process but the processes suffer from the common disadvantage that at least one reaction stage gives rise to a range of products of different molecular weight. Thus, since in many applications the properties of the desired product must conform to a narrowly-defined specification, it is necessary to isolate the desired material from the range of products produced. Production of a commercial product having the desired properties may therefore prove to be an expensive operation. In addition, because of the difficulty of controlling the product distribution, it is not easily possible to tailor-make a product to meet a predefined required combination of properties.

It would be highly desirable if an improved process for the preparation of perfluoropolyethers were available, by means of which improved yields of the desired products could be obtained.

The present invention comprises novel intermediates of value in the preparation of novel perfluoropolyethers and also includes said perfluoropolyethers and novel processes for the preparation of said intermediates and said perfluoropolyethers. The processes offer an improved selectivity towards the desired perfluoropolyethers.

The novel intermediates according to the present invention are substituted polyethers of average general formula:

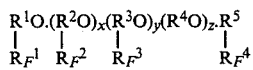
(1)

wherein the symbols $R^1$, $R^2$, $R^3$, $R^4$ and $R^5$ each represent substituted or unsubstituted hydrocarbon groups, which groups may differ, the symbols $R_F^1$, $R_F^2$, $R_F^3$ and $R_F^4$ each represent fluorine-containing hydrocarbon groups containing at least two carbon atoms and at least two fluorine atoms, which groups may differ, or the combination $R^1$-$R_F^1$ and/or the combination $R^5$-$R_F^4$ represents a fluorine-containing alkyl or alkenyl group, x is an integer and each of y and z is zero or an integer, and the sum of x, y and z is at least 2 and not greater then 100, preferably not greater than 50. Within these limits, the ratio of $(x+y):z$ is preferably as high as possible.

These novel intermediates may be prepared by free-radical addition of a straight-chain or cyclic fluoroalkene containing at least two fluorine atoms to a polyether of average general formula:

(2)

or

(3)

In the foregoing general formulae (1), (2) and (3), the groups $R^1$ to $R^5$ may each contain a single carbon atom but preferably at least the groups $R^2$, $R^3$ and $R^4$ contain at least 2 carbon atoms, more preferably from 2 to 4 carbon atoms. The groups may be linear, branched or cyclic and adjacent groups may be combined with the intervening oxygen atom in a cyclic ether group. The group $R^4$ may represent a mixture of groups.

Thus one or more of the groups $R^1$, $R^4$ and $R^5$ may be a —$C_2H_4$— group or a —$C_3H_6$— or —$C_4H_8$— group or the polyether (2) or (3) may be a poly (cyclic ether). If desired, the end-groups $R^1$ and $R^5$ in particular may be substituted groups, for example —$C_2H_4$— groups in which at least one hydrogen atom has already been substituted by a fluorine atom.

The preparation of the substituted polyethers (1) by reaction of the polyethers (2) and (3) with a fluoroalkene entails the introduction of the substituent groups $R_F^2$ and/or $R_F^3$ and it is possible that, in the course of this reaction, two or more such groups may be added to a single alkoxy group. Thus the symbols $R^1$, $R^2$, $R^3$ and $R^5$ in the general formula (1) may specifically represent hydrocarbon groups which contain a substituent fluoroalkyl or fluoroalkenyl group in addition to the $R_F^1$, $R_F^2$, $R_F^3$ and/or $R_F^4$ group shown.

The fluoroalkene with which the foregoing polyether (2) or (3) is reacted contains at least two fluorine atoms and may contain one or more oxygen atoms. In one preferred form of the invention, the fluoroalkene contains not more than 6 carbon atoms. The fluoroalkene may be a straight-chain or cyclic compound and may also contain chlorine atoms. Typical suitable fluoroalkenes include perfluoroethylene, trifluoroethylene, chlorotrifluoroethylene, difluoroethylene, perfluoropropylene and perfluorocyclobutene. Among these, perfluoropropylene is particularly preferred.

The reaction of the polyether (2) or (3) and the fluoroalkene preferably takes place in the presence of an excess of the fluoroalkene, preferably under elevated temperature and pressure. The reaction may be induced by a suitable peroxide such as ditertiary butyl peroxide or by gamma rays.

The foregoing free-radical preparation of the novel polyethers (1) is exemplified hereinafter in greater detail but, by way of general example, a diethyl ether of a polyethylene glycol of the following average formula:

$$CH_3CH_2O(CH_2CH_2O)_n.CH_2CH_3$$

may be reacted with, say, perfluoropropylene to yield a novel, partially fluorinated polyether of the average formula:

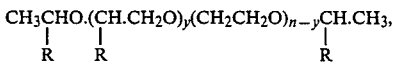

wherein n is 7 or 8, y is 4 or 5 and the symbol R represents the fluoroalkyl group $CF_2.CFH.CF_3$.

The novel polyether intermediate (1) may be converted into perfluoropolyethers by direct fluorination with elemental fluorine in one or more stages. In the final product, not only the hydrogen atoms on the main polyether chain but also those remaining in the groups $R_F^1$ to $R_F^4$ may be replaced by fluorine.

Thus the novel perfluoropolyethers according to the present invention are compounds of average general formula:

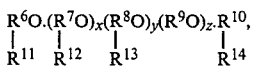

wherein the symbols $R^6$ to $R^{14}$ each represents a fully fluorinated hydrocarbon group, x is an integer and each of y and z is zero or an integer, and the sum of x, y and z is at least 2 and not greater than 100, preferably not greater than 50. Preferably the ratio of (x+y):z is as high as possible. Each of the groups $R^6$, $R^7$, $R^8$ and $R^{10}$ may contain a substituent fully fluorinated hydrocarbon group in addition to the groups $R^{11}$, $R^{12}$, $R^{13}$ and/or $R^{14}$.

One unexpected feature of the invention is that, apparently as a result of the presence of the polyfluoroalkyl groups $R_F$ in the substituted polyether compounds which are the intermediates according to the invention, it is practicable to begin the direct fluorination of these intermediates with elemental fluorine at room temperature. By contrast, for the fluorination of polyethers which, unlike the novel substituted polyethers (1) of the present invention, do not contain fluorine atoms, it is necessary to begin the fluorination at very low temperatures in order to remove the heat of reaction.

Although the fluorination of the novel substituted polyethers can be begun at room temperature, it is desirable that steps be taken nonetheless to control the heat generated by the reaction. Such steps, which depend upon balancing the rate of addition of fluorinating agent against the rate of removal of heat, are well known to those skilled in the art and need not be described at length herein. They include carrying out the reaction in a thin film reactor, wherein the reaction mixture is spread in a thin film over a cooled surface of good thermal conductivity. Such reactors include the Bigelow type reactor. An alternative method of controlling the heat of reaction is by evaporative heat transfer using a refluxing volatile liquid diluent. A third method lies in the use of a so-called "aerosol" reactor.

In one particularly preferred form of the invention, fluorination is effected by introducing a gaseous mixture of fluorine and nitrogen into the substituted polyether in liquid form. The gaseous mixture may be introduced as a stream of fine bubbles, preferably in a reactor wherein the polyether and the gaseous mixture meet in counterflow. The reaction is preferably carried out at atmospheric pressure or more preferably under a somewhat elevated pressure. If desired, the reaction may be assisted by, for example, irradiating the reaction mixture with ultra-violet light.

When the fluorinating agent is a mixture of fluorine and nitrogen, the concentration of fluorine in the mixture may be progressively increased as the reaction proceeds until the polyether is fully fluorinated. For example, the reaction may be begun using a fluorine/nitrogen mixture containing a relatively small percentage, say 5 to 25 percent, of fluorine, which may progressively be increased to 100 percent fluorine to remove the last unsubstituted hydrogen atoms from the polyether molecule.

The invention will now be further described and illustrated by means of the following examples:

EXAMPLE 1

Preparation of a Polyether Starting Material.

Sodium hydride (4.0 g, 0.096 mol. 60% immersion in oil) was suspended in toluene (25 ml) in a dry flask fitted with a reflux condenser, a dropping funnel and a nitrogen inlet. The flask was constantly purged with nitrogen. Dry polyethylene glycol (av. mol. wt. 400) [PEG400] (20.06 g, 0.05 mol) in toluene (50 ml) was slowly added to the flask, while constantly stirring, via the dropping funnel. The di-sodium salt, a viscous brown liquid, formed immediately. The mixture was stirred at 20° C. for one hour, then at 110° C. for 3 hours. The toluene was removed first by distillation and finally by warming under vacuum to leave the di-sodium salt of PEG400 in quantitative yield.

Ethyl iodide (25.2 g, 0.16 mol) was added to the di-sodium salt slowly at 20° C. and immediate vigorous reaction occurred. After the reaction subsided, the mixture was heated under reflux for 3 hours. Excess ethyl iodide was distilled from the flask to leave a brown liquid which was purified by dissolving in dichloromethane and passing over alumina, to yield polyethylene glycol diethyl ether (av. mol. wt. 456) 16.7 g (73%).

EXAMPLE 2

Preparation of a Substituted Polyether Intermediate.

A nickel tube (70 ml), fitted with a valve, was charged with polyethylene glycol diethyl ether (456) (5.3 g, 0.011 mol) and ditertiary butyl peroxide (1.5 g., 0.01 mol), cooled (liquid air) and evacuated to high vacuum. The contents were degassed using freeze-thaw cycles under vacuum. Hexafluoropropene (40 g, 0.26 mol) was transferred into the tube under vacuum and the tube sealed. The tube was heated to 140° C. for 30 hours while rocking. After that period the tube was cooled (liquid air), opened to a vacuum system, and the volatile components transferred to a cold trap by allowing the tube to warm to room temperature. The residual liquid product was dissolved in chloroform, passed over alumina, and then removal of the solvent yielded a mixture of compounds averaging to $C_{40}F_{36}H_{46}O_{10}$. 13.1 g (85%). (Found: C, 32.9; H, 3.1; F, 51.7: $C_{40}F_{36}H_{46}O_{10}$ requires C, 35; H, 3.3; F, 49%)

This polyadduct of hexafluoropropene (otherwise perfluoropropylene) with the polyethylene glycol diethyl ether was interpreted as having the average formula:

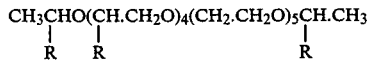

wherein R is the group CF$_2$.CFH.CF$_3$

EXAMPLE 3

Preparation of a Perfluoropolyether.

The product of Example 2 (2.1 g, 1.5 m. mol) was placed in a glass tube into which dipped a stainless steel capillary tube for the passage of fluorine, and the system was purged with nitrogen for 20 minutes. The nitrogen flow was then replaced by a flow of 25% fluorine in nitrogen (50 ml/min.). This flow was maintained for 2 hours at 20° C., then 3 hours at 50° C., after which a 50% fluorine in nitrogen mixture was used (50 ml/min.) dropping the temperature to 20° C. for 2 hours then raising to 50° C. for 3 hours. The product was a clear viscous liquid (1.85 g).

This liquid product (0.6 g) was sealed in a nickel tube (70 ml capacity) fitted with a monel valve, the system evacuated to high vacuum and the valve sealed. Fluorine (0.86 g, 22.6 m.mol) was condensed into the tube as previously described and the tube allowed to warm to room temperature where it remained for 10 hours. The tube was then vented, re-evacuated and fluorine (0.86 g, 22.6 m.mol) condensed into the tube, the tube was heated to 40° C. for 15 hours. After this the tube was once again vented, re-evacuated and refilled with fluorine (0.86 g, 22.6 m.mol) and then heated to 60° C. for 10 hours. The tube was then vented, opened, purged with nitrogen and the products extracted with 1,1,2-trichlorotrifluoroethane. The products were a viscous clear liquid C$_{40}$F$_{82}$O$_{10}$ (0.43 g) in approximately 20% yield. The overall yield was depreciated by handling losses attributable to the small size of the sample.

EXAMPLE 4

Preparation of a Substituted Polyether Intermediate.

Using a reaction procedure analogous to that of Example 2, a mixture containing polyethylene glycol (600) diethyl ether (6.7 g, 0.01 mol), ditertiarybutyl peroxide (1.43 g, 0.01 mol) and hexafluoropropene (43.2 g, 0.29 mol) was heated for 36 hours at 140° C. Work-up yielded 19.4 g (84%) of a mixture averaging to C$_{63}$F$_{66}$H$_{62}$O$_{14}$. (Found: C, 31.5; H, 2.4; F, 56.0: C$_{63}$F$_{66}$H$_{62}$O$_{14}$ requires: C, 33.0; H, 2.7; F, 54.5%).

This polyadduct was interpreted as having the average formla:

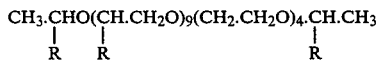

where R is the group CF$_2$.CFH.CF$_3$

EXAMPLE 5

Preparation of a Perfluoropolyether.

Using a procedure analogous to that of Example 3, 3.8 g of the polyadduct mixture obtained in Example 4 were fluorinated using a fluorine/nitrogen mixture containing 25 percent fluorine for 2 hours at 20° C., then the same mixture for 6 hours at 50° C. and finally a 50 percent mixture for 8 hours at 50° C.

The partly fluorinated material thus obtained was then treated with fluorine (0.86 g, 22.6 m mol) in a nickel tube as described in Example 3 and the tube was heated to 40° C. for 24 hours. The tube was vented, re-evacuated and refilled with fluorine (0.86 g, 22.6 m mol) and heated to 60° C. for 24 hours. The procedure was repeated using fluorine (0.86 g) and subsequent heating to 70° C. for 24 hours.

After venting, the tube was purged with nitrogen and the product extracted with 1,1,2-trichlorotrifluoroethane. Removal of solvent under high vacuum left a clear viscous liquid (1.6 g, 27%) averaging to C$_{63}$F$_{128}$O$_{14}$. (Found: C, 24.7; F, 67.3; C$_{63}$F$_{128}$O$_{14}$ requires C, 22.2; F, 71.7%).

EXAMPLE 6

Preparation of a Substituted Polyether Intermediate.

Using a reaction procedure analogous to that of Example 2, a mixture containing 4.1 g (2.0 m mol) of the diethyl ether of polyethylene glycol (2000), ditertiarybutyl peroxide (1.4 g, 0.01 mol) and hexafluoropropene (30 g, 0.2 mol) was heated to 140° C. for 36 hours. Work-up of the reaction mixture yielded a mixture of polyadducts averaging to C$_{154}$H$_{190}$F$_{120}$O$_{46}$ (8.1 g, 80%). (Found: C, 35.0; H, 3.1; F, 46.2: C$_{154}$H$_{190}$F$_{120}$O$_{46}$ requires: C, 37.6; H, 3.8; F, 45.1%).

This polyadduct was interpreted as having the average formula:

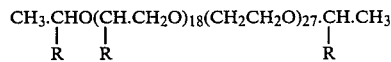

where R is the group CF$_2$CFH CF$_3$.

EXAMPLE 7

Preparation of a Perfluoropolyether.

Using a procedure analogous to that of Example 3, the polyadduct mixture obtained in Example 6 (3.6 g) was fluorinated using 25 percent fluorine in nitrogen for 2 hours at 20° C. and for 6 hours at 50° C., then using 50 percent fluorine in nitrogen for 8 hours at 50° C. The partly fluorinated material so obtained was then treated with fluorine (0.86 g, 22.6 m mol) in a nickel tube, as described in Example 3, at 40° C. over 24 hours. The process was repeated with the same amount of fluorine and the tube heated to 60° C., 70° C. and 70° C. respectively, for 24 hours in each case.

Work-up of the reaction product gave a clear viscous liquid averaging C$_{154}$F$_{310}$O$_{46}$ (2.1 g, 34%). (Found: C, 23.2; F, 66.8; C$_{154}$F$_{310}$O$_{46}$ requires C, 21.8; F, 69.5%)

EXAMPLE 8

Preparation of a Substituted Polyether Intermediate.

A 1-liter autoclave was charged with the diethyl ether (32 g, 0.05 mol) of polyethylene glycol (600), hexafluoropropene (675 g, 4.5 mol) and ditertiarybutyl peroxide (5 g, 0.045 mol). The autoclave was heated to 140° C. for 36 hours, with continuous stirring. Excess hexafluoropropene was removed by vacuum transfer and the residual product, dissolved in dichloromethane, was purified by chromatography over alumina. Removal of solvent under high vacuum yielded a mixture of polyadducts averaging to C$_{69}$H$_{62}$F$_{78}$O$_{14}$ (113 g, 87%). (Found: C, 30.4; H, 2.3; F, 58.1: $C_{69}H_{62}F_{78}O_{14}$ requires C, 31.7; H, 2.4; F, 56.9%).

The polyadduct was interpreted as having the average formula:

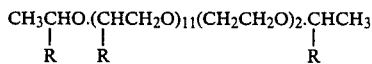

where R is the group $CF_2.CFH.CF_3$.

In subsequent tests, the perfluoropolyethers obtained in Examples 5 and 7 and derived from polyethylene glycols 600 and 2000 respectively were studied by NMR and showed no evidence of any residual hydrogen atoms in the molecule. Prolonged heating of samples of these two perfluoropolyethers under high vacuum at 100° C. showed no loss of weight.

As already indicated, perfluoropolyethers are distinguished by an attractive combination of properties including high resistance to thermal and chemical attack, very low solubility in many solvents and excellent lubricating properties. They are therefore of particular value as lubricants in chemically aggressive environments (for example in oxygen and chlorine compressors) or for highly sensitive equipment (for example the drives for computer discs and tapes) or as surface lubricants for computer discs and tapes. Perfluoropolyethers may also be sprayed on to porous surfaces (for example masonry) to provide repellency to liquid water (for example in the form of acid rain). They have further value as highly stable hydraulic fluids.

I claim:

1. A substituted polyether intermediate of the general formula

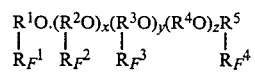

wherein the symbols $R^1$, $R^2$, $R^3$, $R^4$ and $R^5$ each represent an alkyl group containing from 1 to 4 carbon atoms, which alkyl groups may differ, the symbols $R_F^1$, $R_F^2$, $R_F^3$ and $R_F^4$ each represent fluorine-containing hydrocarbon groups containing from 2 to 6 carbon atoms, which hydrocarbon groups may differ, x is an integer and each of y and z is zero or an integer, and the sum of x, y and z is at least 2 and not greater than 100.

2. A substituted polyether intermediate according to claim 1, wherein each of the groups $R^2$, $R^3$ and $R^4$ contains at least two carbon atoms.

3. A substituted polyether intermediate according to claim 2, wherein each of the groups $R^2$ and $R^4$ contains two carbon atoms and y equals zero.

4. A substituted polyether intermediate of the general formula

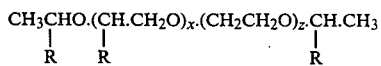

wherein R is the group $CF_2.CFH.CF_3$ and x and z are integers together totalling not more than 50.

5. An intermediate according to claim 4 wherein X is four and Z is five.

* * * * *